S. PECK.
SAFETY-CLAMP AND HOOK FOR CULTIVATORS.
No. 194,310.  Patented Aug. 21, 1877.
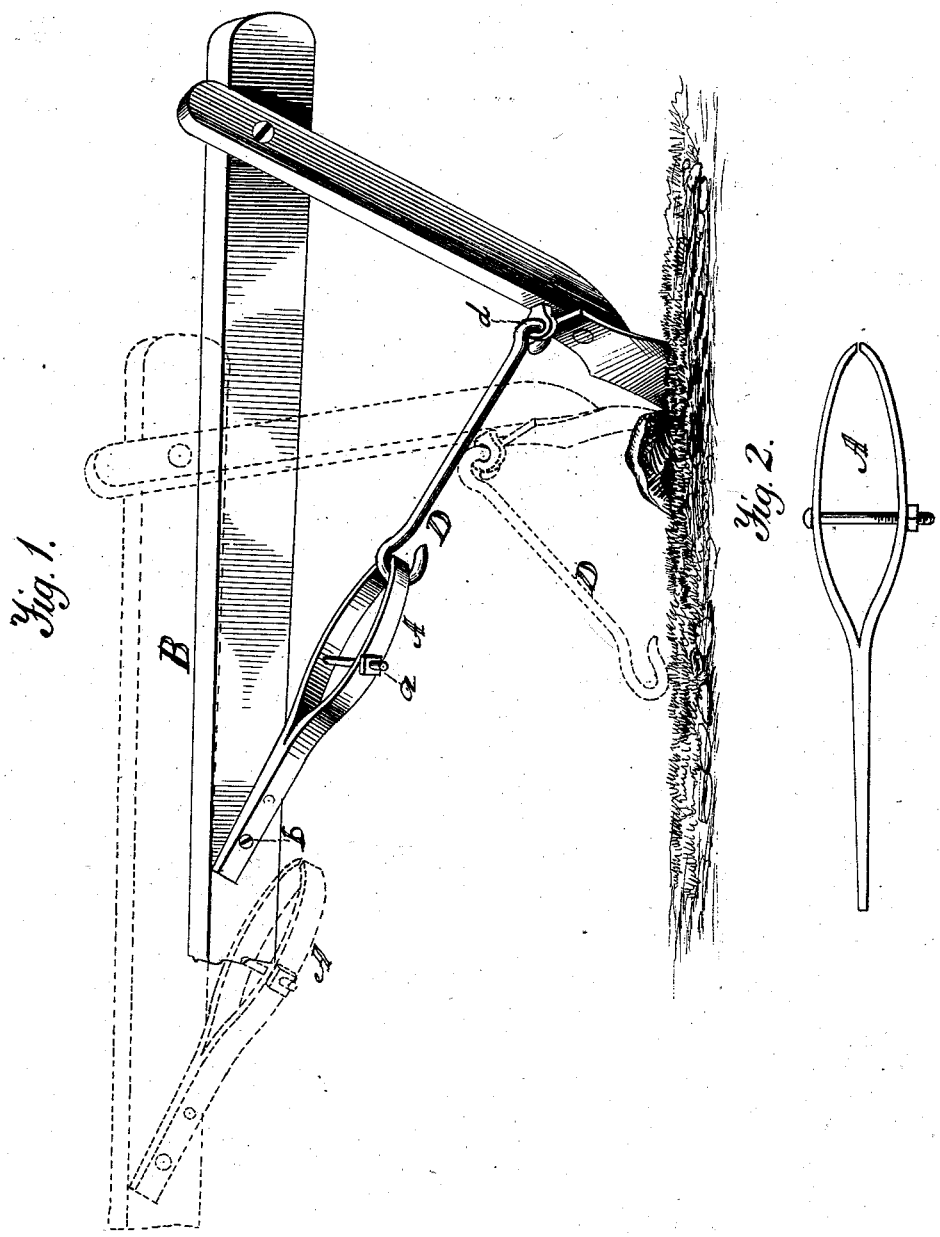
Witnesses.
A. Ruppert
Henry C. Swan
Inventor:
Sanford Peck
per Isaac N. Arnold
atty.

UNITED STATES PATENT OFFICE.

SANFORD PECK, OF WALDRON, ILLINOIS.

IMPROVEMENT IN SAFETY CLAMPS AND HOOKS FOR CULTIVATORS.

Specification forming part of Letters Patent No. 194,310, dated August 21, 1877; application filed July 17, 1877.

*To all whom it may concern:*

Be it known that I, SANFORD PECK, of Waldron, in the county of Kankakee and State of Illinois, have invented certain new and useful Improvements in Safety Clamp and Hook for Grain-Drills, &c.; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a view of my invention as attached to a corn plow or cultivator. Fig. 2 is a cross or edge view of the clamp.

The object of my invention is to supply the place of the wooden safety-pin heretofore used in grain-drills, cultivators, and similar implements.

In Fig. 1 the clamp A is attached to the beam B by a bolt, $b$, the nut thereof being tightened only sufficiently to allow the free motion of the clamp.

The jaws of the clamp A are tightened or loosened by means of the bolt and nut $a$, adapting the plow or drill to a stiff or loose soil.

The hook D is attached to the standard of the plow or cultivator, or to the spout of the grain-drill, as shown at $d$.

Upon the point of the shovel or spout striking an obstruction sufficient to cause a breakage where no safety attachment is used, the hook D is drawn through the jaws of the clamp A—a movement of the parts results as shown by the dotted lines—and a breakage is thereby prevented.

The hook D can now be replaced in the clamp, and the plow or drill be made ready for work in much less time than is required to apply the wooden safety-pin heretofore used.

Having thus described my invention, what I claim is—

The combination of the hook D and the spring-clamp A, having the adjusting-screw $a$, and attached to the beam B and the standard, in the manner and for the purpose set forth.

In testimony that I claim the foregoing as my own I affix my signature in presence of two witnesses.

SANFORD PECK.

Witnesses:
 REVILO BEEBE,
 R. H. WATSON.